United States Patent [19]

Charles

[11] 3,769,460

[45] Oct. 30, 1973

[54] MOBILE HOME TELEPHONE TERMINAL SYSTEM

[76] Inventor: Joseph T. Charles, 2 Woodbine, Rolling Meadows, Ill.

[22] Filed: Mar. 9, 1972

[21] Appl. No.: 233,202

[52] U.S. Cl. ................ 179/1 VE, 174/51, 280/422, 179/1 PC

[51] Int. Cl. ............................................ H04m 1/72

[58] Field of Search ............... 179/1 VE, 1 PC, 186; 339/2, 10, 14 R, 263 R, 263 L; 174/51, 58, 60; 280/420, 422

[56] References Cited

UNITED STATES PATENTS

| | | | |
|---|---|---|---|
| 3,614,538 | 10/1971 | Nickola | 174/38 |
| 3,652,779 | 3/1972 | Grinols | 174/38 |
| 2,896,128 | 7/1959 | Fuller et al. | 179/186 |
| 3,668,324 | 6/1972 | Firestone | 179/1 PC |

*Primary Examiner*—Kathleen H. Claffy
*Assistant Examiner*—Douglas W. Olms
*Attorney*—C. Frederick Leydig et al.

[57] ABSTRACT

A mobile home telephone terminal system which includes a five-conductor cable having two pairs of conductors for connection to the conductors in a telephone service line and a fifth conductor for connection to grounding means. The fifth conductor is connected to the chassis of the mobile home for grounding purposes, with the connection being made via a terminal plate assembly which includes clamping means for mounting a terminal plate on a conductive portion of the chassis of the mobile home and for making electrical contact therewith. A standard telephone station protector may be mounted on the terminal plate on the mobile home. If the station protector is not mounted on the mobile home, due to access difficulties for example, the protector may be mounted at the opposite end of the five-conductor cable in a closure adapted to be partially buried and housing the connection between the five-conductor cable and the service line, with the terminal plate, without the protector, still being mounted on the mobile home chassis for use as a grounding and connection means. This closure also provides a convenient storage means for the five-conductor cable and the terminal assembly connected thereto when the corresponding service line is disconnected. The closure also includes means for connecting the grounding conductor to a grounding stake when it is desirable to do so.

16 Claims, 11 Drawing Figures

MOBILE HOME TELEPHONE TERMINAL SYSTEM

DESCRIPTION OF THE INVENTION

The present invention relates generally to systems for connecting telephone service lines to subscriber facilities and, more particularly, to an improved mobile home telephone terminal system.

It is a primary object of the invention to provide an improved mobile home telephone terminal system which insures reliable grounding of the mobile home. In this connection, a more specific object of the invention is to provide such an improved terminal system which minimizes the danger of electrical shocks to telephone service personnel.

Another important object of the invention is to provide an improved terminal system of the foregoing type which facilitates installation of the standard telephone service units, such as station protectors and subscriber terminal blocks, while also minimizing or even eliminating the dangers due to mounting such units on the walls of mobile homes or other surfaces which may conceal potentially dangerous utility lines or the like.

A further object of the invention is to provide such an improved terminal system which insures access by telephone service personnel, to the station protector in the service line to each mobile home, regardless of the structure of the mobile home. Thus, one specific object of the invention is to provide a system which insures access to the station protector regardless of whether the mobile home is open around the bottom, as is common in the southern parts of the United States, or is closed around the bottom, as is common in the northern parts of the United States.

Yet another object of the invention is to provide such an improved terminal system which facilitates repeated connections and disconnections of the line serving any particular mobile home site. A related object of this aspect of the invention is to permit the use of the same equipment, including the cable, throughout repeated connections and disconnections of the service line to a given site, and to permit secure storage of the connecting equipment at the site whenever the line is disconnected. A still further object of the invention is to provide an improved terminal system of the foregoing type which significantly reduces the likelihood of damage to, or tampering with, the terminal system.

One of the objectives of the invention is to also provide a mobile home telephone terminal system which is aesthetically pleasing.

Still another object of the invention is to provide such an improved terminal system which can be manufactured at high production rates and a low cost, and which can be quickly and efficiently installed.

Other objects and advantages of the invention will become apparent from the following detailed description taken in connection with the accompanying drawings, in which.

Figures 1, 2:
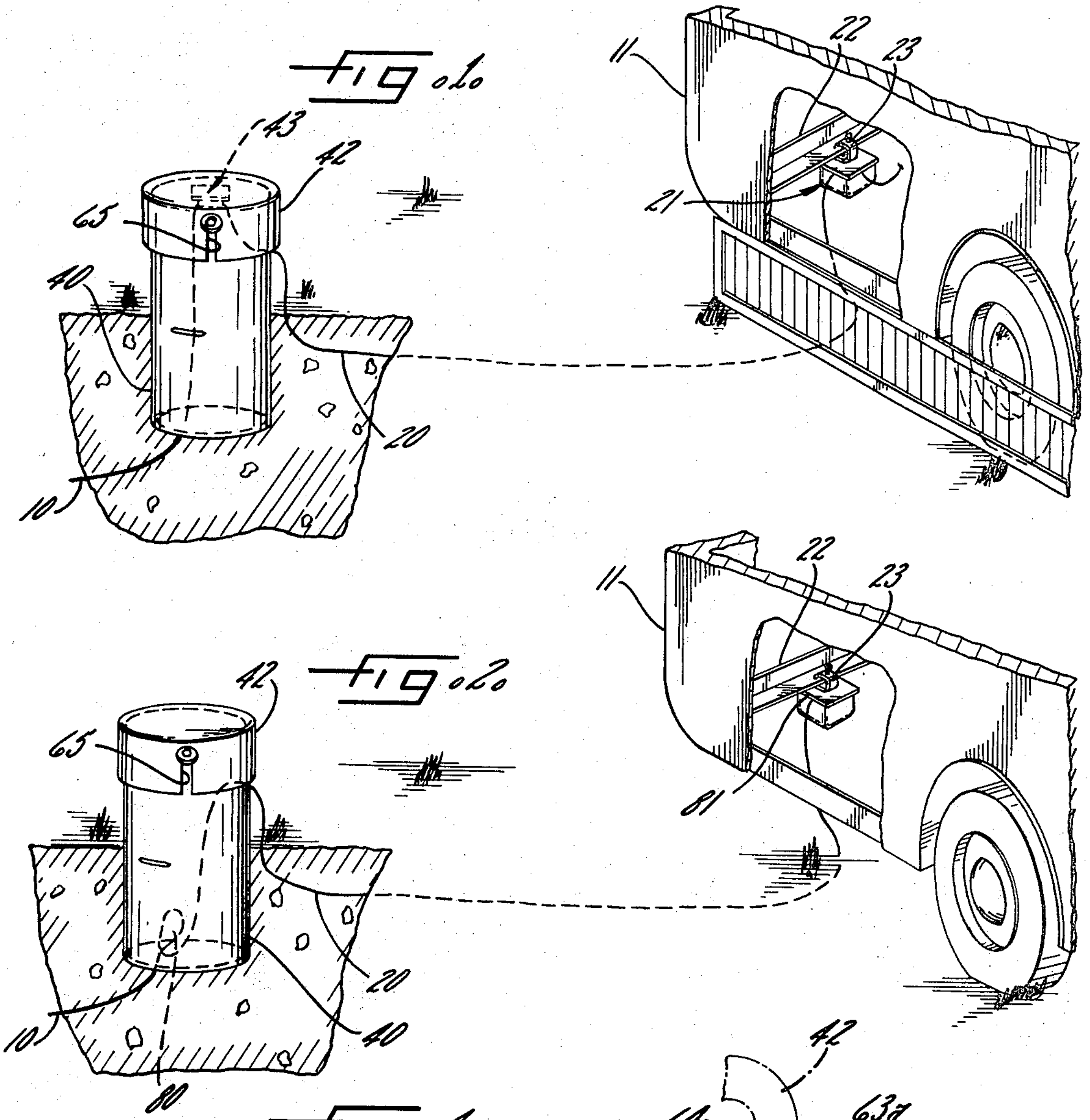
FIG. 1 is a perspective view of one embodiment of the terminal system of this invention connected to a mobile home.
FIG. 2 is a perspective view of another embodiment of the terminal system of this invention connected to a mobile home.
Figure 4:
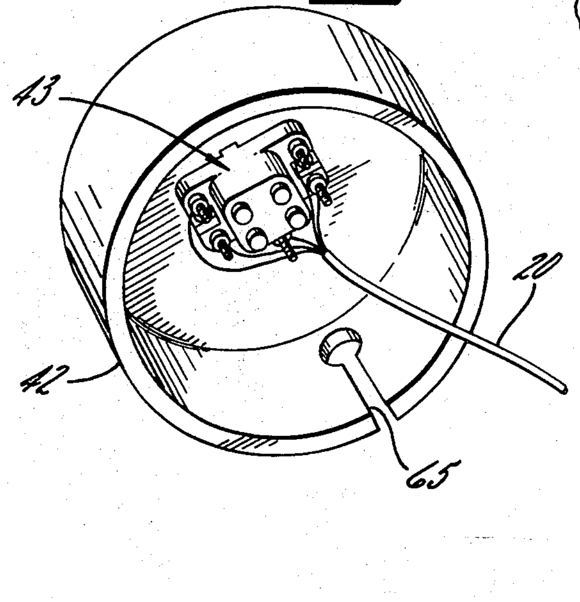
FIG. 4 is an enlarged perspective view of the underside of the cover of the closure assembly of FIG. 3 with the station protector secured thereto.
Figure 5:
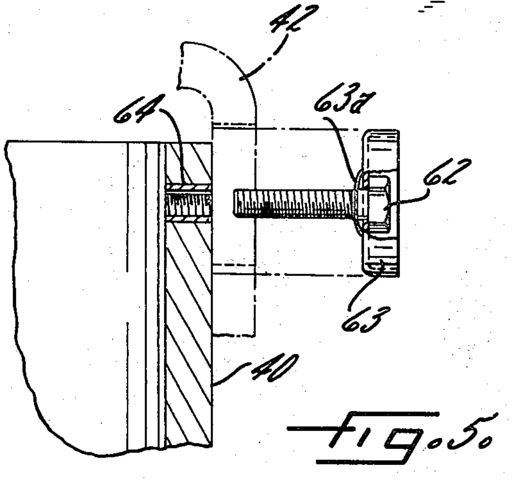
FIG. 5 is an enlarged fragmentary section of the top end of the closure assembly of FIG. 3 and a side elevation of the fastener for fastening the cover to the body of the closure assembly.

While the invention is susceptible of various modifications and alternative forms, certain specific embodiments thereof have been shown by way of example in the drawings which will be described in detail herein. It should be understood, however, that it is not intended to limit the invention to the particular forms disclosed but, on the contrary, the intention is to cover all modifications, equivalents and alternatives falling within the spirit and scope of the invention.

Turning now to the drawings, and referring first to FIG. 1, there is shown a standard telephone service line 10 for providing telephone service to a mobile home site where a mobile home 11 is located. The telephone service line 10 typically includes two pairs of conductors so that two telephone lines may be furnished to the mobile home 11 if desired. The service line 10 also often includes a built-in grounding element. As will be understood by those familiar with this art, the service line 10 is normally buried near the mobile home site and must be connected and disconnected from the various mobile homes which may arrive at and depart from the site served by the service line 10 over a period of years.

In accordance with one important aspect of the present invention, a five-conductor cable connects the telephone service line to a terminal plate assembly mounted on the chassis of the mobile home and providing an electrical ground connection between one of the cable conductors and the mobile home chassis. The terminal plate assembly also carries means for connecting the other four cable conductors to telephones within the mobile home. Thus, in the illustrative system of FIG. 1, an insulated five-conductor cable 20 has two pairs of conductors for connection to two corresponding pairs of conductors in the telephone service line 10, and a fifth conductor for connection to the grounding element of the service line 10 or other suitable grounding means. The five-conductor cable leads to a terminal plate assembly 21 secured to the chassis 22 of the mobile home 11 by means of a conductive beam clamp 23. As can be seen more clearly in FIG. 7, the beam clamp 23 is generally C-shaped to fit over a flange of the chassis 22 and has a bolt 24 threaded through one arm 24a of the C for gripping the chassis flange firmly between the end of the bolt 24 and the opposite arm 24b of the C. This beam clamp 23 not only mounts the terminal plate assembly on the chassis of the mobile home, but also provides a means of connecting the ground conductor in the five-conductor cable 20 to the chassis of the mobile home.

For the purpose of connecting the beam clamp 23 to the other parts of the terminal plate assembly 21, and at the same time providing an electrical connection between the beam clamp 23 and the ground conductor of the cable 20, a conductive bolt 25 is threaded through a terminal plate 26 and into the arm 23b of the beam clamp 23. The ground conductor of the cable 20 is wrapped around the shank of the conductive bolt 25 and then wedged firmly in place between the upper surface of the terminal block 20 and the underside of the head of the bolt 25 as the bolt 25 is threaded into the beam clamp 23, thereby providing a hard-wired connection between the cable 20 and the chassis 22 of the mobile home 11.

The terminal block 26 is typically made of plastic or other suitable insulating material, and has four threaded connectors 28, 29, 30 and 31 for connecting the two pairs of telephone line conductors from the cable 20 to corresponding conductors leading to telephones within the mobile home. It will be understood that the respective conductors to be connected are simply wrapped around the threaded connectors 28–31, after which the connectors are threaded down into the terminal block to wedge the conductors firmly in place between the heads of the respective connectors and the upper surface of the terminal block 26. The connectors 28–31 are all separated from each other, and from the conductive ground bolt 25, by means of outwardly projecting ribs 32 which are typically formed as an integral part of the terminal plate 26. To enclose the exposed ends of the conductors fastened to the terminal block 26, a conventional station protector cap 33 is snapped over the raised central portion 27 of the block 26, with lugs 33a on the lower inside periphery of the cap snapping into openings 27a formed at the base of the raised central portion 27 to hold the cap 33 in place. An access opening 33b formed in the base of the cap 33 fits over the conductors connected to the terminal plate.

Figures 3, 6, 7:
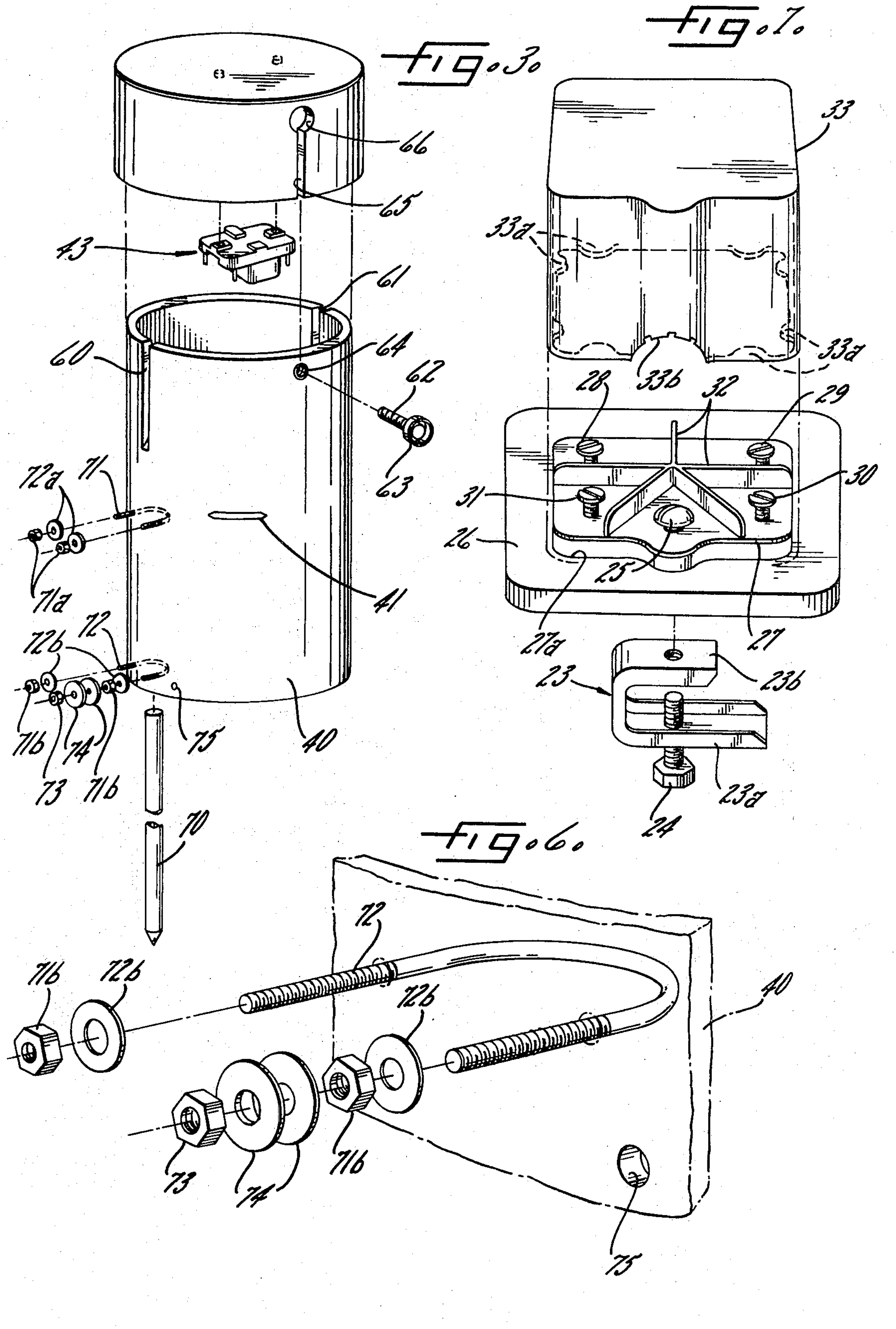
FIG. 3 is an enlarged exploded perspective of the closure assembly in the terminal system of FIG. 1 with an alternate form of ground connector.
FIG. 6 is an enlarged exploded perspective of an alternate ground connector included in the closure assembly of FIG. 3.
FIG. 7 is an enlarged exploded perspective of the terminal plate assembly that is secured to the mobile home in the system of FIG. 1.
Figures 8, 9, 10, 11:
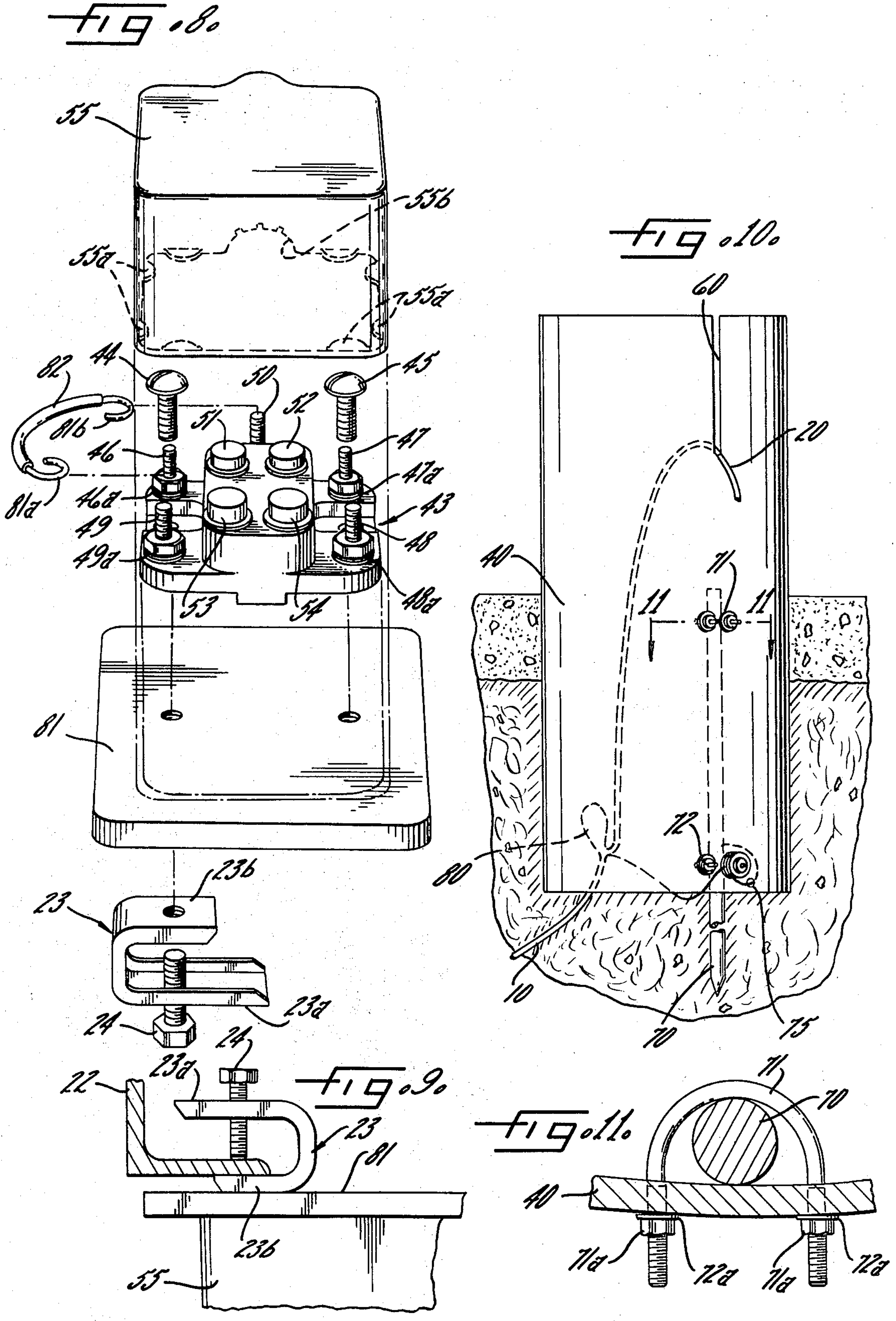
FIG. 8 is an enlarged exploded perspective of the terminal plate assembly that is secured to the mobile home in the system of FIG. 2.
FIG. 9 is an enlarged fragmentary elevation, partially in section, of the clamp securing the terminal plate assembly of FIG. 7 or 8 to the frame of the mobile home.
FIG. 10 is an enlarged side elevation of the assembled body portion of the closure assembly of FIG. 3.
FIG. 11 is an enlarged section taken along line 11-11 in FIG. 10.

In accordance with another aspect of the present invention, the electrical connection between the five-conductor cable 20 and the telephone service line 10 is enclosed within a closure adapted to be partially embedded in the soil near the end of the telephone service line 10, on or near the site of the mobile home 11. Thus, in the illustrative system of FIG. 1, a cylindrical closure 40 is buried in the soil up to the level of a ground level marker 41 (FIG. 3). The cylindrical closure 40 has a removable cover 42 adapted to fit snugly down over the open upper end of the cylinder 40. The telephone service line 10 enters the closure through the open lower end thereof, and is connected to the five-conductor cable 20 via a standard telephone station protector unit 43 bolted to the underside of the cover 42. The detailed structure of a typical station protector 43 is shown in FIG. 8, and includes a pair of bolts 44 and 45 for fastening the protector 43 to a suitable support, which in the system of FIG. 1 is the closure cover 42. The protector 43 also includes four threaded connectors 46, 47, 48 and 49 fitted with four corresponding nuts 46a, 47a, 48a and 49a for connecting the four conductors of the service line 10 to the four corresponding conductors in the five-conductor cable 20. A fifth threaded connector 50 fitted with a nut (not shown) receives the ground conductor of the cable 20. The four connectors 46 through 49 are internally connected to the common ground stud 50 via four separate voltage sensitive elements 51, 52, 53 and 54 which are rendered momentarily conductive in response to voltage surges on any of the line conductors. These voltage sensitive elements 51–54 may take a variety of different forms, one example of which is a gas-filled tube, such as the type SVP tube manufactured by Siemans Corporation, Iselin, New Jersey. These tubes contain an ionizable gas which renders the tube momentarily conductive in response to a voltage surge in one of the line conductors, thereby dissipating the excess voltage to ground. When the voltage surge exceeds the tube's discharge capability, metallic elements within the tube fuse to provide a permanent short circuit to ground, thereby providing a fail-safe function. To enclose the exposed ends of the conductors connected to the respective connectors 46 through 51, a standard station protector cap 55 is snapped over the protector 43 and held in place by lugs 55a snapping under the base of the protector. An access opening 55b formed in the base of the cap 55 fits over the conductors connected to the protector.

To permit access to the upper region of the closure 40 from either side thereof, a pair of vertical slots 60 and 61 are formed in the side walls thereof. These slots 60 and 61 are open at the top edge of the cylindrical closure 40 to facilitate the insertion of the cable 20 and/or an above-ground service line 10 into the slots. Then when the cover 42 is lowered onto the closure it presses the cable and/or the service lines down to the bottoms of the slots 60 and 61.

In order to fasten the cover 42 to the body portion of the closure 40, a bolt 62 fitted with a cup washer 63 held in place by a lock washer 63a is threaded into an internally threaded sleeve 64 extending through the wall of the closure 40 near the top end thereof. When the cover 42 is lowered onto the closure 40, a vertical slot 65 extending upwardly from the lower edge of the cover 42 slides over the shank portion of the bolt 62 until the cup washer 63 comes into register with a corresponding aperture 66 formed at the upper end of the slot 65. The bolt 62 is then threaded through the sleeve 64 to press the cup washer 63 into the aperture 66, thereby locking the cover firmly in place on the closure 40.

In the event that the telephone service line 10 does not have a built-in grounding element, the grounding stud 50 of the station protector 43 may be connected to a conventional grounding stake 70. As shown in FIGS. 3, 6, and 10, the closure 40 is provided with a pair of U bolts 71 and 72 for securing a grounding stake 70 to the inside wall of the closure 40. Both U bolts 71 and 72 have threaded ends which extend outwardly through the walls of the closure 40 to receive respective nuts 71a, 72a and washers 71b and 72b for drawing the clamps 71 and 72 outwardly and thereby wedging the grounding stake 70 firmly between the inner ends of the U bolts and the side wall of the closure 40. In addition, one leg of the lower U bolt 72 is provided with an additional nut 73 and a pair of copper washers 74 for receiving conductors for connecting the grounding stake 70 to the ground conductor of the cable 20, as illustrated in FIG. 10. An aperture 75 is formed in the closure 40 near the bottom thereof to pass the conductor 76 from the grounding stake 70 to the copper washers 74.

In addition to providing a convenient closure for the station protector and the connection between the five-conductor cable 20 and the service line 10, the closure 40 also provides a convenient housing for all the above-ground equipment in the terminal system when it is not in use. Thus, when the terminal plate 26 and beam clamp 23 are removed from the mobile home 11, the entire five-conductor cable 20 may be wound into a coil and placed into the closure 40, along with the terminal plate 26, the beam clamp 23, the cap 33 and any other above-ground equipment included in the terminal system, and stored there until they are needed again.

In accordance with a further aspect of the present invention, the telephone station protector is mounted directly on the terminal plate on the mobile home chassis so that the protector, in effect, takes the place of the terminal block. This arrangement not only eliminates the terminal block, but also avoids the need for mounting the station protector on the closure cover, thereby simplifying the connecting and disconnecting of the terminal system. This modified form of the terminal system, which is illustrated in FIG. 2, is particularly useful with mobile homes which are open around the bottom thereof, as are often found in the southern parts of the United States where weather conditions do not require enclosing the bottom of the trailer. When the trailer is open around the bottom, i.e., between the underside of the mobile home and the ground, the mounting of the station protector directly on the mobile home chassis does not restrict access to the protector by telephone service personnel. On the other hand, when the mobile home is closed around the bottom, as is the custom in the colder portions of the United States, the telephone service personnel would not have ready access to a protector mounted on the mobile home chassis, and thus the system of FIG. 1 is preferred in such locations.

Turning more specifically to the modified system of FIG. 2, the connection between the buried service line 10 and the five-conductor cable 20 is made by means of a conventional splice 80. Equipment for making such splices are well known and readily available in the art, and are typically enclosed in a weather-tight plastic closure to protect the electrical connections effected thereby. At the trailer end of the cable 20, the five conductors are connected to the five connectors 46–50 in the same manner described above in connection with the system of FIG. 1. In this case, however, the protector 43 is mounted on a terminal plate 81, as illustrated in FIG. 8, rather than on the underside of the closure cover 42. As illustrated in FIG. 8, the station protector 43 is attached to the terminal plate 81 by threading the two bolts 44 and 45 downwardly into corresponding threaded holes in the terminal plate 81.

To effect both a mechanical and an electrical connection of the beam clamp 23 to the station protector 43, the bolt 44 is threaded entirely through the terminal plate 27 into the short arm 23b of the clamp 23. This same bolt 44 is then connected to the ground connector 50 by means of a conventional ground strap 82 having exposed ends 81*a* and 81*b* which are looped around the bolt 44 and the ground connector 50, respectively.

As can be seen from the foregoing detailed description, this invention provides an improved mobile home telephone terminal system which insures reliable grounding of the mobile home, thereby minimizing the danger of electrical shocks to telephone service personnel. Furthermore, this improved terminal system facilitates installation of the standard telephone service units, such as station protectors and subscriber terminal blocks, while minimizing or even eliminating the dangers due to mounting such units on the walls of mobile homes or other surfaces which may conceal potentially dangerous utility lines or the like. This improved terminal system also insures access by telephone service personnel to the station protector in the service line to each mobile home, regardless of whether the mobile home is open or closed around the bottom. Thus, where the bottom of the mobile home is closed because of relatively cold climate conditions, the station protector is simply mounted within the closure rather than on the mobile home chassis. In relatively warm climates where the bottom of the mobile home is left open, the connection and disconnection of the terminal system may be somewhat simplified by mounting the station protector directly on the chassis of the mobile home. Moreover, the convenient storage space provided by the closure for housing the connection between the service line and the five-conductor cable permits secure storage of the connecting equipment, including the five-conductor cable, whenever the service line is disconnected from a particular mobile home site, thereby permitted use of the same equipment throughout repeated connections and disconnections while at the same time minimizing the likelihood of damage to, or tampering with, the terminal system. Finally, the improved terminal system provided by this invention is aesthetically pleasing, can be manufactured at high production rates and a low cost, and can be quickly and efficiently installed.

I claim as my invention:

1. A mobile home telephone terminal system comprising the combination of a five-conductor cable having two pairs of conductors for connection to two corresponding pairs of conductors in a telephone service line and a fifth conductor for connection to grounding means, and a terminal plate assembly including a terminal plate, clamping means for mounting said terminal plate on a conductive portion of the mobile home and for making an electrically conductive contact with the mobile home, means on said terminal plate for connecting said two pairs of conductors from said five-conductor cable to telephones within the mobile home, and means for connecting said fifth conductor from said five-conductor cable to said clamping means to establish an electrical ground connection to said mobile home, whereby mounting the terminal plate on a conductive portion of the mobile home automatically provides an electrical ground for the mobile home and telephone.

2. A terminal system as set forth in claim 1 which includes a closure adapted to be partially embedded in the soil on or near the site of the mobile home for enclosing the connection between said five-conductor cable and the telephone service line.

3. A terminal system as set forth in claim 2 wherein said closure forms a storage chamber for receiving the entire length of said five-conductor cable when said cable is disconnected from the mobile home, said closure also having a removable cover for providing access to said storage chamber.

4. A terminal system as set forth in claim 2 wherein said closure includes means for mounting a standard telephone station protector unit within said closure, said closure also having a removable cover for providing access to said storage chamber.

5. A terminal system as set forth in claim 2 wherein said closure includes means for connecting the closure to a grounding stake, and means for electrically connecting the grounding stake to said fifth conductor of said five-conductor cable.

6. A terminal system as set forth in claim 1 wherein said clamping means comprises a conductive beam clamp for mounting said terminal plate on the chassis of the mobile home, said beam clamp being fastened to the terminal plate assembly by a conductive member for making a grounding connection with said fifth conductor of said five-conductor cable.

7. A terminal system as set forth in claim 1 wherein said terminal plate assembly includes means for mounting a standard telephone station protector unit on said terminal plate, and means for electrically connecting the ground terminal of said protector unit to said clamping means.

8. A terminal system as set forth in claim 7 wherein said terminal plate includes means for receiving a standard cover for a standard telephone station protector unit.

9. A method of connecting a telephone service line to the mobile home of a subscriber, said method comprising the steps of providing a five-conductor cable having two pairs of telephone service line conductors and a fifth ground conductor, connecting one end of said two pairs of line conductors to two corresponding pairs of conductors in a telephone service line connected to a distribution line, connecting one end of said fifth conductor to grounding means, clamping a terminal plate assembly on a conductive portion of the mobile home to make an electrically conductive contact with the mobile home, connecting the other ends of said two pairs of line conductors in said cable to the terminal plate assembly mounted on the mobile home, and connecting the other end of said fifth conductor to the terminal plate assembly to establish an electrical ground connection to said mobile home, whereby connecting the end of the fifth conductor to the terminal plate assembly automatically provides an electrical ground for the mobile home and telephone.

10. A method as set forth in claim 9 wherein said one end of said five-conductor cable is connected to the telephone service line via a telephone station protector unit.

11. A method as set forth in claim 9 wherein said one end of said fifth conductor is connected to grounding means on the telephone service line.

12. A method as set forth in claim 9 wherein said one end of said fifth conductor is connected to a grounding stake.

13. A method as set forth in claim 9 wherein said other end of said five-conductor cable is connected to said mobile home via a telephone station protector unit included in said terminal plate assembly mounted on the mobile home.

14. A method as set forth in claim 9 wherein said other end of said five-conductor cable is connected to said mobile home via a conductive clamp mounting said terminal plate assembly on the chassis of said mobile home.

15. A method as set forth in claim 9 that includes the steps of providing a closure on or near the site of the mobile home, and enclosing the connection between said five-conductor cable and the telephone service line within said closure.

16. A method as set forth in claim 15 that includes the step of storing said five-conductor cable in said closure when said cable is disconnected from the mobile home.

* * * * *